Aug. 19, 1952  D. R. DE BOISBLANC  2,607,215
MULTIPLE MIXING CIRCUIT FOR ELECTRONIC DETONATION PICKUPS
Filed May 7, 1946  2 SHEETS—SHEET 1

INVENTOR.
D. R. DE BOISBLANC
BY Hudson & Young
ATTORNEYS

Patented Aug. 19, 1952

2,607,215

UNITED STATES PATENT OFFICE 2,607,215

MULTIPLE MIXING CIRCUIT FOR ELECTRONIC DETONATION PICKUPS

Deslonde R. de Boisblanc, Bartlesville, Okla., assignor to Phillips Petroleum Company, a corporation of Delaware Application May 7, 1946, Serial No. 667,828

3 Claims. (Cl. 73—35)

This invention relates to electrical circuits for measuring voltages. In a more specific aspect it relates to detonation meters that measure peak voltages generated in special pick-ups in internal combustion engines in response to detonation therein. In another specific aspect it relates to means to select portions of the outputs of a plurality of such pick-ups and mix said outputs. In still another specific aspect it relates to means to graphically or otherwise indicate said mixture of selected portions.

As is well understood, knocking in an internal combustion engine results when the explosive mixture detonates in an engine cylinder and large differences in pressure are generated within the cylinder. These pressure waves are converted into sound waves within the cylinder and are reflected back and forth until their energy is dissipated. These sound waves are modified by the sound wave components generated as a normal incident to the operation of internal combustion engines such as sound waves generated by the operation of the intake and exhaust valves of the engine and the pressure waves generated by the normal operation of the engine.

In my copending application Serial No. 548,757, filed August 9, 1944, now Patent No. 2,448,323, for "Detonation Meter" I disclosed a detonation meter adapted to measure voltages from a single pick-up in response to detonation in a single cylinder of an internal combustion engine. While such a single cylinder detonation meter is highly useful both in testing fuels and in indicating preformance of that one cylinder, in a multicylinder engine, such as an aircraft engine, it is highly useful to have an indication of the preformance of all of the cylinders simultaneously and preferably continuously. Obviously the use of a complete detonation meter as shown in my said copending application for each cylinder of a multicylinder engine is too expensive and cumbersome, and also cannot be observed properly as a man cannot observe a number of dials simultaneously due to limitations common to all human beings, especially if the observer is also engaged in piloting an aircraft.

In the present invention the detonation meter circuit is inoperative except when rendered operative momentarily by a pulse from a synchronized multivibrator. This multivibrator produces such a pulse each time the interrupter in the ignition system of the engine produces a spark to ignite one of the cylinders of the engine. This results in the detonation meter and indicators indicating only the detonations occurring in each cylinder as these detonations occur during the short duration of the pulses from the multivibrator, while other noises, such as valve clatter, occurring at other times than the pulses from the multivibrator can not pass through the detonation meter circuit.

One object of the present invention is to provide a detonation indicating means for indicating the detonations of each cylinder of a multicylinder engine.

Another object is to provide a means of mixing the outputs of a plurality of electromagnetic pick-ups in such a manner that only certain components will be observed.

Another object is to provide a means of observing on a cathode-ray tube the time sequence in which those selected components occur.

Another object is to provide means whereby the relative detonation levels of the cylinders of a multicylinder engine may be indicated for purposes of comparison.

Another object is to provide a detonation meter circuit only operative when actuated by a multivibrator in turn actuated by the ignition of each cylinder of a multicylinder engine.

Numerous other objects and advantages will be apparent to those skilled in the art upon reading the accompanying specification, claims and drawings.

Figure 1:
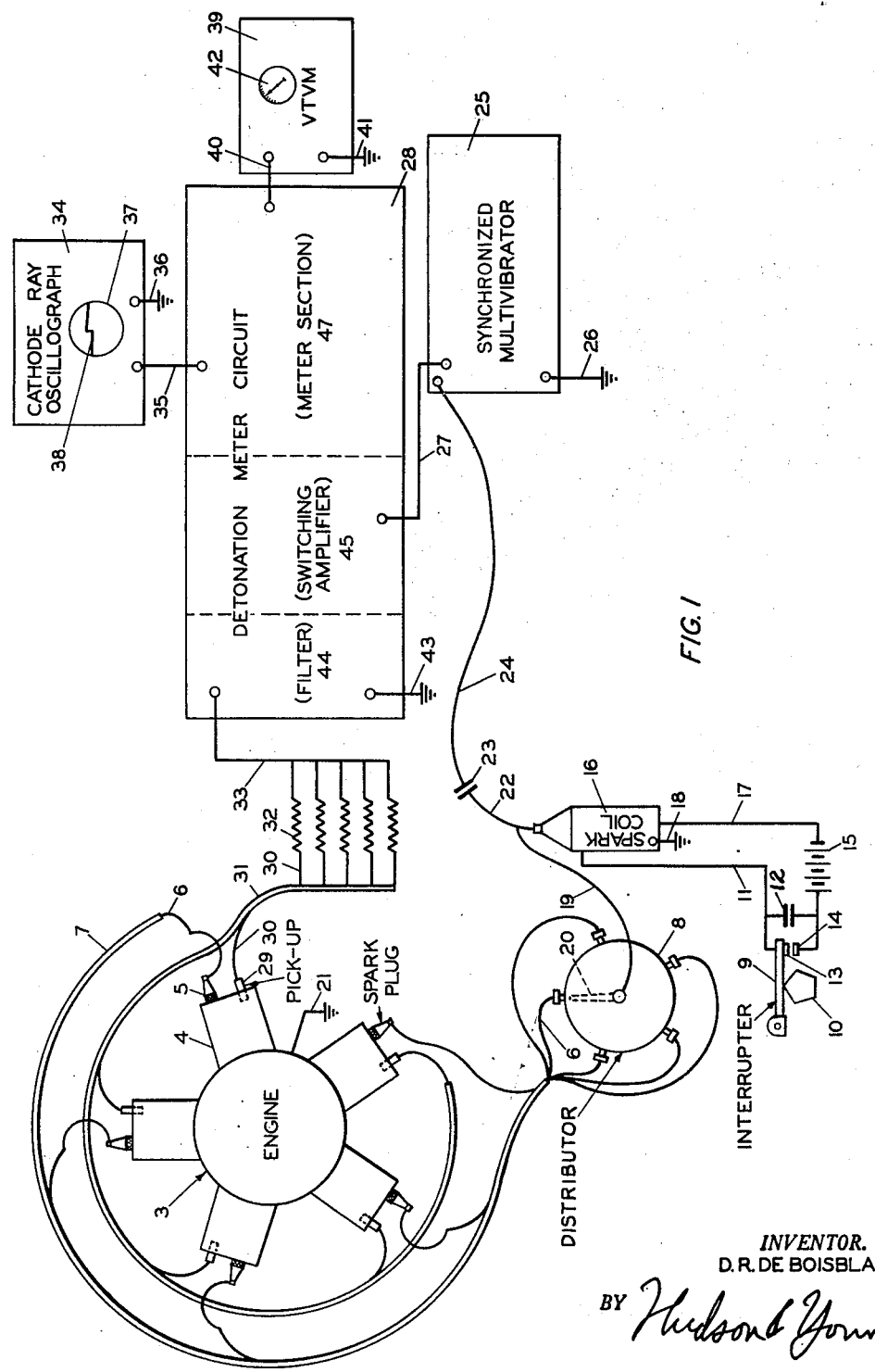
Figure 1 is a schematic wiring diagram showing an embodiment of the present invention applied to a conventional internal combustion engine and conventional ignition system.

In Figure 1 a multicylinder internal combustion engine is indicated by a symbol generally designated as 3. A radial engine having 5 cylinders is shown, but obviously any other multicylinder engine could be used in the present invention. Each cylinder 4 has a spark plug 5, the wire 6 of which is contained in housing 7 with the other wires 6, but wires 6 are not connected. Wires 6 lead to the usual distributor 8. The usual interrupter 9 actuated by cam 10 driven by a shaft of engine 3 (shaft not shown) interrupts the circuit in wire 11 and condenser 12 prevents excess arcing between points 13 and 14. Battery 15 provides current in wire 11 when points 13 and 14 are closed and this primary current flows through a few turns of a primary coil in the usual spark coil 16 and returns through wire 17 to battery 15. The spark coil 16 is really a step up transformer and contains a large number of turns of a secondary coil (not shown) grounded at one end at 18, the other end being connected by wire 19 to arm 20.

When the primary circuit is broken at 13, 14, by cam 10 the sudden drop in primary current induces a strong surge of current in the secondary, and this secondary current goes through wire 19, arm 20, the proper wire 6, plug 5, the spark plug gap (not shown), the engine 3, ground 21 and ground 18 back to the secondary coil. The arm 20 is also driven by an engine shaft which may be the one driving cam 10, and points to the proper wire 6 to fire the proper cylinder 4 at the time the current pulse comes through wire 19. Parts 3 to 21 are all conventional and any other engine and/or electric engine ignition system may be substituted for them in the practice of my invention. These systems need not be conventional, for example the novel "Ignition System" of George H. Marmont, patented December 11, 1945, No. 2,390,842, may be employed. In operating with Marmont's device however a separate wire and a condenser leading from each of wires 90 of his device are joined in parallel to wire 24 of my present drawings to couple his ignition system and my multivibrator; instead of the single wire 22, condenser 23 and wire 24 shown in the present drawings when a single spark coil 16 is employed. Magneto ignition may be employed without invention, in fact any ignition system supplying a pulse to 25 every time a spark plug fires will embody the present invention.

The novel elements of the combination shown in Figure 1 will now be described:

Connected to wire 19 is wire 22 coupled by condenser 23 and wire 24 to multivibrator 25. Multivibrator 25 has a ground 26 and a lead 27 coupling it to detonation meter circuit 28.

Each of cylinders 4 of engine 3 has a pick-up 29 mounted therein in the conventional manner, and each pick-up is connected to the detonation meter circuit by means of wires 30, collected (but not joined) by cable 31, each wire 30 being connected through its respective isolating resistance 32 to wire 33 and thereby to the detonation meter circuit 28.

A cathode-ray oscillograph 34 may be connected to circuit 28 by wire 35 and may be grounded at 36. Such oscillographs are common and therefore no further description of the same is deemed necessary, except to state that on screen 37 waves having time as one coordinate and voltage or current as the other coordinate may be viewed momentarily, and the shape and size estimated. If desired lines may be ruled on screen 37 to aid in such estimates of size and shape.

Such cathode-ray oscilloscopes are ordinarily supplied with a sweep circuit so that the electron beam moves very rapidly from one side to the other of the screen and then returns slowly, variations in beam intensity occurring during this relatively slow return period producing a trace upon the screen. In this apparatus, the sweep frequency may be manually adjusted so as to correspond in length to a complete cycle of engine operation. Moreover, in conventional oscilloscopes, a terminal is provided for applying a periodic voltage to the sweep circuit to make it lock in with the frequency of an outside circuit. Evidently, in the present apparatus, the sweep circuit may be locked in with any desired one of the ignition cables leading to the spark plugs. This will cause the sweep frequency to have a period precisely equal to the length of a complete cycle of engine operation. In either case, the traces representative of detonation in any particular cylinder occupy a localized region upon the oscillograph screen and, accordingly, the oscillograph enables an operator to determine, in a qualitative manner, the cylinder or cylinders in which detonation is occurring.

A vacuum tube voltmeter 39 may be connected to circuit 28 by wire 40 and grounded at 41 and on the dial 42 thereof the degree of knock intensity may be indicated; for example the peak knock intensity over a short period of time may be indicated in the manner set forth in my said copending application. However the present invention is not limited to the indication of peak knock intensity by meter 39, as other types of detonation indication old in the art may be employed, and circuit 28 may be varied as taught by such other types of detonation indication old in the art so that 42 will show some other function or parameter of the detonation. The ground of circuit 28 is indicated at 43.

Figure 2:
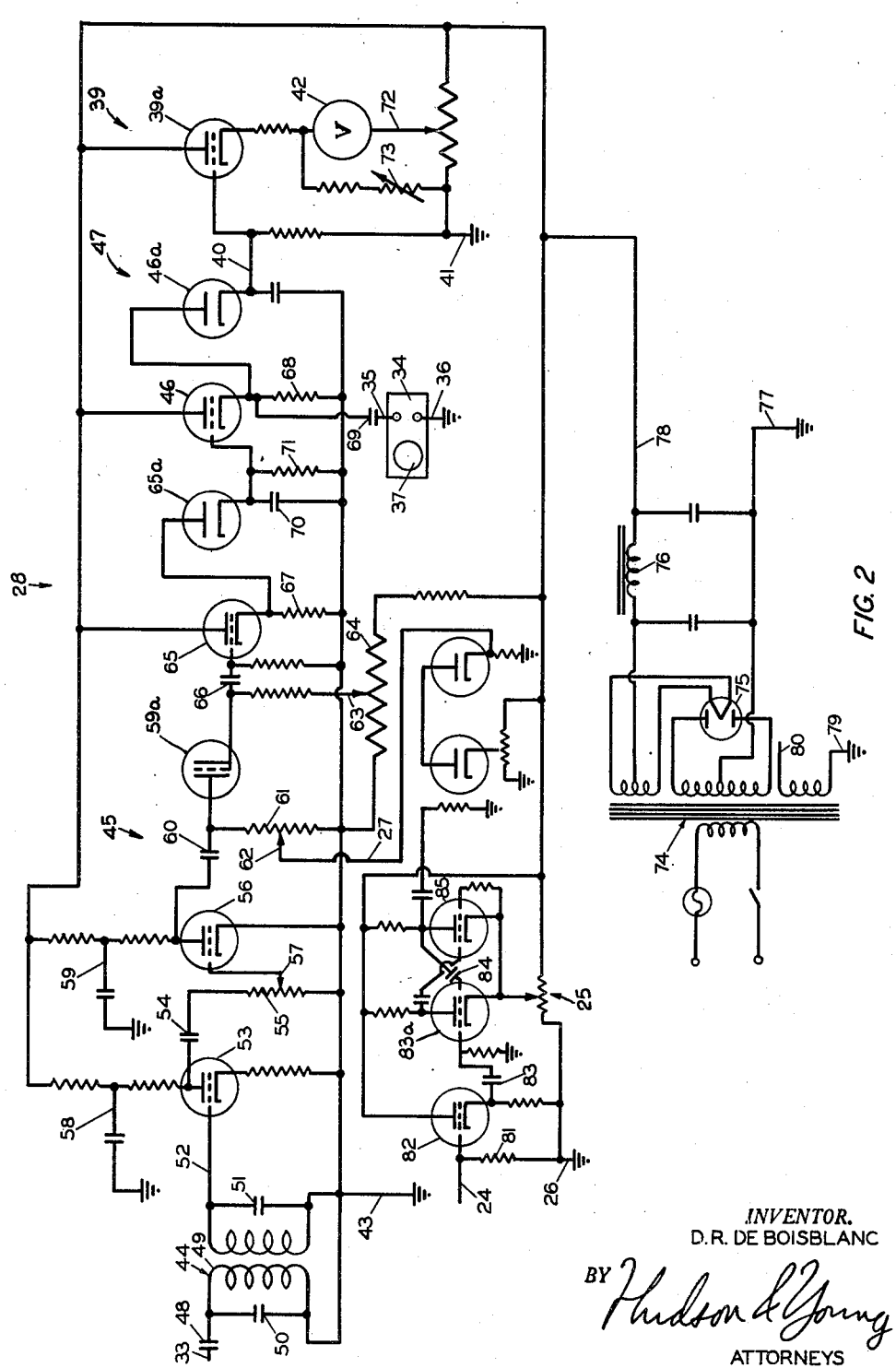
Figure 2 is a detailed wiring diagram suitable for use in the detonation meter circuit and synchronized multivibrator shown in Figure 1.

For the purposes of presenting an embodiment of the present invention however, the peak knock intensity detonation meter circuit of my said copending application will be employed for illustrative purposes in Figure 2.

In Figure 2, parts 24, 25, 26, 27, 28, 33, 34, 35, 36, 37, 39, 40, 41, 42 and 43 are the same as in Figure 1. Parts 25, 28 and 39 are only generally designated as obviously the exact limit or extent of such elements is indefinite in a circuit diagram as shown in Figure 2. For example a certain tube, condenser or resistance could be considered as part of either unit.

Part 28 may further be regarded as comprising a filter section 44, a switching amplifier section 45, and a meter section 47, all connected in series as stated with the pick-ups 29 connected to the filter section 44 at 33, and the output of the detonation section 47 actuating the vacuum tube voltmeter 42 by wire 40. The multivibrator 25 is tied into the switching amplifier section 45 at 27 and the cathode-ray oscillograph is tied into section 47 at 35. These sections of part 28 will now be described.

Wire 33 is coupled to the filter section 44 by coupling condenser 48. Filter section 44 may comprise a critically coupled band pass filter resonant at about 6500 cycles per second comprising a transformer 49 and condensers 50 and 51. Filter section 44 is coupled to switching amplifier section 45 by wire 52. This type filter is suitable to the indication of peak knock intensities over short time periods. However other filter circuits may be substituted by those skilled in the art, such as a low pass filter allowing the passage of voltages lying below 2,000 cycles when a duplication of the results of the ASTM bouncing pin meter is desirable (none of the material in this sentence being shown, but being believed obvious upon consideration of parts 18 to 25 inclusive of my copending application Serial No. 629,675, filed November 19, 1945, now Patent No. 2,534,005 for "Detonation Meters and Methods of Measuring Detonation").

The switching amplifier 45 may comprise any suitable form of vacuum tube amplifier. As shown the signal on 52 is impressed on the grid of tube 53 forming the first stage of a conventionally coupled amplifier, coupled by condenser 54 and resistance 55 to second stage tube 56. Other amplifiers may be used, and tubes 53 and 56 may be a single duo-triode tube (such as a 7F7). The gain of the amplifier is controlled by the position of slider 57 on resistance 55 and suitable decoupling may be provided at 58 and 59. Tube 56 is shown coupled to tube 59a by condenser 60 and resistance 61. The amplitude of voltage pulses from multivibrator 25 applied to the plate of tube 59a is controlled by the position of slider 62 on resistance 61.

Tube 59a is really a diode as the grid is tied to the cathode. The substitution of similar tubes and equivalent circuits obviously lies within the scope of my invention. Tube 59a prevents the amplifier from passing a signal below a voltage predetermined by the setting of slider 63 on resistance 64 because the diode 59a will not conduct below said predetermined voltage, and tube 59a thus acts as a control of the threshold for the remaining portion of the circuit. In some instances other switching amplifiers (generally designated as 45) may be employed which do not contain such a threshold, but in the embodiment shown in Figure 2, I prefer to employ such a variable threshold to eliminate small detonations below a predetermined value.

While some indication would be visible on screen 37 without further change in the voltages from tube 59a, it is preferred to form sustained pulses having an amplitude which is a function or parameter of the intensity of detonation as it is easier to see and estimate the value of them than to observe the detonation waves themselves. Therefore, I have included an exponential pulse generator comprising tubes 65 and 65a and related parts coupled to a sustained pulse generator comprising tubes 46 and 46a and related parts. Condenser 66 is merely a coupling condenser employed to eliminate direct current bias which may be introduced by diode 59a. The output of diode 65a is an exponential form voltage pulse for the detonation of each cylinder 4 because resistance 67 is relatively large. The output of diode 65a is applied to the grid of triode 46 which forms a tuned amplifier. The function of said triode 46 is to eliminate any remaining voltage fluctuations caused by the introduction of voltage pulses at 62 from the multivibrator 25, and obviously any conventional tuned amplifier or other filter may be employed at this point. The output of tuned amplifier 46 is converted into a sustained pulse because resistance 68 is relatively large. This sustained pulse is applied to cathode-ray oscillograph 34 through coupling condenser 69 and appears on screen 37 in readily observable form.

The tuning of amplifier 46 is accomplished by selecting suitable values for condenser 70 and resistance 71.

The sustained pulse generated by tube 46 and resistance 68 may also be applied to diode 46a of a detonation meter circuit (generally designated 47) where it is rectified and applied through wire 40 to any standard vacuum tube voltmeter circuit 39. This voltmeter circuit comprises a tube 39a, milliameter 42, zero reading adjustment slider 72 and meter gain or meter scale adjustment rheostat 73.

The apparatus is preferably powered by means of a suitable power pack of well known form generally designated 74, including full wave vacuum tube rectifier 75 and suitable filter circuit 76. The output is applied on its negative side to ground at 77 and its positive side through connection 78 to the various tubes as shown. The heaters in the tubes (not shown) operate on current between ground 79 and point 80.

This leaves only the multivibrator section 25 to be described. Multivibrator 25 is triggered by pulses coming from coil 16 via wires 22 and 24. These pulses are applied across terminal resistance 81 to the grid of triode 82.

Tube 82 acts as a buffer to prevent multivibrator 25 from sending pulses back into wire 24. The pulses from tube 82 are applied through conventional coupling condenser 83 to the grid of triode 83a and then through condenser 84 to the plate of triode 85. The multivibrator may be of any known type, but preferably comprises tubes 83a and 85 with their grids and plates cross coupled as shown, which multivibrator (generally designated 25) produces a uniform amplitude and uniform amplitude-time area pulse (not shown) in wire 27 for each pulse of any type received from wire 24. It is preferred to use a multivibrator rather than any other type of pulse generator, because, for example, the pulses from coil 16 are so irregular due to differences in each individual spark plug circuit 5, 6, etc. that if integrated and clipped the pulses generated would be of unequal amplitude-time area.

The pulses from multivibrator 25 are applied to resistance 61 by wire 27 and slider 62.

*Operation*

The operation of Figure 1 is as follows:

The apparatus shown is installed and motor 3 is started.

One problem in the most efficient operation of internal combustion engines is to find the lowest fuel-air ratio that will give the desired power output without injury to the engine. This problem is especially important in aircraft operation where the engines operate at the same rate of speed for long periods of time. It has been found that conditions on the verge of incipient knocking produce maximum usable power for the fuel burned, at a given fuel-air ratio, but that detonations of real knocking intensity are highly destructive to the engine. This information can be used for engine or fuel test operation of engines, or as an indication of safe cruising behavior of the engine which is not destructive to the engine.

Therefore the operator can watch screen 37 to see how the different cylinders are operating relative to detonation and read the peak value of detonation in the engine on dial 42.

The pick-ups 29 which are constantly picking up all types of pressure waves and vibrations in the cylinders, are preferably magneto-striction pressure responsive pick-ups. The voltage output of this pick-up is substantially proportional to the rate of change of pressure in the cylinder. This pick-up generates voltage pulses of various frequencies for valve clatter as well as for detonation, as explained more fully in my said two copending applications.

These voltage pulses pass through resistances 32 to mix on wire 33 and be filtered in filter 44. While filter 44 is preferably selective to favor detonation vibration frequencies nevertheless some voltages caused by valve clatter pass through. It is impractical to cut out these valve clatter voltages when they are created by a number of cylinders at once by a threshold such as 59a, 63, and 64.

Fortunately the detonations occur at a different time than the valve clatter. Therefore by setting threshold 63, 64 high enough to prevent the passage of any voltages from the pick-ups 29 except when a square pulse from multivibrator 25 is added at 62, the detonations alone may be selected if the square pulses are produced in the multivibrator at the right time.

I have found that the detonations occur just the right time after the ignition spark that the spark voltage changes produced in coil 16 may be taken from any point on wire 19 and used to trigger the multivibrator through wires 22, 24 and the grid of tube 32. The multivibrator 25 therefore produces a square pulse for each ignition, and as the time interval of this square pulse is controlled by the design of the multivibrator 25 I have found that these square pulses may be of just sufficient time duration to last just as long as the detonation voltages from that particular cylinder and no longer.

While the voltages containing only variations due to detonation and very minor fluctuations introduced by the multivibrator 25 may be taken from condenser 66 and run through any cathode ray hook up, or detonation meter hook up, old in the art, preferably after passage through some sort of filter, such as a tuned amplifier, it is preferred to transform the voltages from condenser 66 into easily visible sustained pulses, easy to see and measure. This is because the actual detonation wave form is of such high frequency as to be a blur on screen 37, and the needle of instrument 42 could not follow each fluctuation.

Therefore voltages from 66 are made into exponential pulses by tube 65 and large resistance 67, these pulses are rectified into direct current pulses by diode 65a, and then made into direct current pulses of long duration (but still having slow exponential decay) by tube 46 and large resistance 68. The shape of these waves is shown in exaggerated manner as line 38 on screen 37.

As fully explained in my said copending application Serial No. 548,757, now Patent No. 2,448,323, the circuit shown will make the height of line 38, and the reading of meter 42 a function, or parameter, of the peak detonation intensity over a short period, the period being set as shorter than the time between successive explosions of engine 3 so that each cylinder may make its record on screen 37 so that the operator can check the performance of each cylinder of his engine, and adjust the fuel-air ratio to the verge of incipient knocking to obtain maximum power if desired, or merely observe conditions with or without engine adjustments as he sees fit.

However the present invention is not limited to any particular circuits, or to any values recorded on dial 42, or to any shapes of waves appearing on screen 37, and either cathode ray oscillograph 34, or voltmeter 39 may be eliminated from some embodiments of the invention.

While this invention has been described in connection with certain specific embodiments, the principle involved is susceptible of numerous other applications that will readily occur to persons skilled in the art. The invention is, therefore, to be limited only as indicated by the scope of the appended claims.

Having described my invention, I claim:

1. The combination; with an internal combustion engine having a plurality of cylinders, a spark plug in each cylinder, and an ignition system including a source of sparking potential, and a distributor for selectively applying such sparking potential to the respective spark plugs; of a detonation pickup mounted on each cylinder; detonation indicating means having an input circuit, a threshold device actuated by said input circuit, and an output circuit; a plurality of isolating resistors connecting the respective detonation pickups to said input circuit; an output indicating device actuated by said output circuit; a pulse generator coupled to said threshold device so that each pulse produced by said pulse generator causes the threshold device to become operative to pass signals through said detonation indicating means, said threshold device being inoperative when no pulse is impressed thereon from said pulse generating circuit; and a single circuit path coupling said pulse generating circuit directly to said source of ignition current whereby each impulse of sparking potential causes a pulse to be produced by said generating circuit.

2. A device constructed in accordance with claim 1 in which the output indicating device is a vacuum tube voltmeter.

3. A device constructed in accordance with claim 1 in which the output indicating device is a cathode-ray oscilloscope having at least two pairs of deflecting plates, said oscilloscope being provided with a sweep circuit applied to a first pair of deflecting plates, the frequency of said sweep circuit being such that the cathode-ray beam sweeps across the oscillograph tube once during each cycle of engine operation, the signal from said output circuit being applied to a second pair of deflecting plates whereby detonation in each of said plurality of engine cylinders provides a deflection of said cathode-ray beam at a distinct region on the oscilloscope screen.

DESLONDE R. DE BOISBLANC.

REFERENCES CITED

The following references are of record in the file of this patent:

UNITED STATES PATENTS

| Number | Name | Date |
|---|---|---|
| 1,907,415 | Carpenter et al. | May 2, 1933 |
| 2,113,825 | Caldwell et al. | Apr. 12, 1938 |
| 2,225,381 | Van Dijck | Dec. 17, 1940 |
| 2,292,045 | Lancor | July 28, 1942 |
| 2,319,219 | Draper et al. | May 18, 1943 |
| 2,337,522 | Eldredge | Dec. 21, 1943 |
| 2,395,902 | Nisewanger et al. | Mar. 5, 1946 |
| 2,403,527 | Hershberger | July 9, 1946 |
| 2,448,322 | Piety | Aug. 31, 1948 |
| 2,534,276 | Lancor | Dec. 19, 1950 |